E. Totman,

Horse Power.

No. 2,723. Reissued Aug. 6, 1867.

Witnesses.

R. G. Campbell.
Edw. Schaper.

Inventor.

Edwell Totman

AM. PHOTO-LITHO. CO. N.Y. (OSBORNE'S PROCESS)

United States Patent Office.

EDSELL TOTMAN, OF COLUMBUS, PENNSYLVANIA.

*Letters Patent No.* 46,833, *dated March* 14, 1865; *reissue No.* 2,723, *dated August* 6, 1867.

IMPROVEMENT IN HORSE-POWER.

The Schedule referred to in these Letters Patent and making part of the same.

TO WHOM IT MAY CONCERN:

Be it known that I, EDSELL TOTMAN, of Columbus, in the county of Warren, and State of Pennsylvania, have invented an improved Horse-Power for driving Sawing or other Machinery; and I do hereby declare that the following is a full, clear, and exact description thereof, reference being had to the accompanying drawings, making part of this specification, in which—

Similar letters of reference indicate corresponding parts in the several figures.

This invention relates to a new and useful improvement of horse-powers which are adapted for operating log-sawing machinery, grinding-mills, and other varieties of machinery, where it is neither convenient nor desirable to use a steam engine. The invention is designed chiefly to so construct a horse-power that compactness and portability, with a general convenience of arrangement, are obtained without in any manner detracting from the efficiency of the machine as a mechanical power; at the same time a machine is produced which is very simple, cheap, and not liable to derangement, and which can be constructed, when the castings are obtained, by any ordinary workman.

The first part of my invention consists in the combination of a stationary spur-wheel having a driving-shaft passing through its centre, and carrying upon one end a pinion spur-wheel, with a rotating spur-wheel and pinion applied on the shortest arm of a triangular or braced sweep, which latter turns about the axis of said shaft, and which carries the wheels around with it so as to transmit from the stationary wheel a rapid rotary motion to the driving-shaft, as will be hereinafter described.

It also consists in sustaining the revolving sweep, to which an animal is attached, by means of a horizontal transverse brace, which is applied to a hub through which the driving-shaft passes, and arranged over the stationary or master wheel, and in employing, in conjunction therewith, lower guides and stays arranged at right angles to said cross-brace, as will be hereinafter substantially described, for the purpose of keeping the sweep, and the wheels which it carries, in a proper position, and preventing them from tilting or binding in their revolution about the driving-shaft.

It also consists in providing for the transmission of a rotary or a reciprocating motion direct from the driving-shaft, when this shaft forms the axis of motion of a sweep, and is driven by means of the latter acting through the medium of a stationary wheel and revolving wheels, as will be hereinafter substantially described.

To enable others skilled in the art to understand my invention, I will describe its construction and operation.

Figure 1:
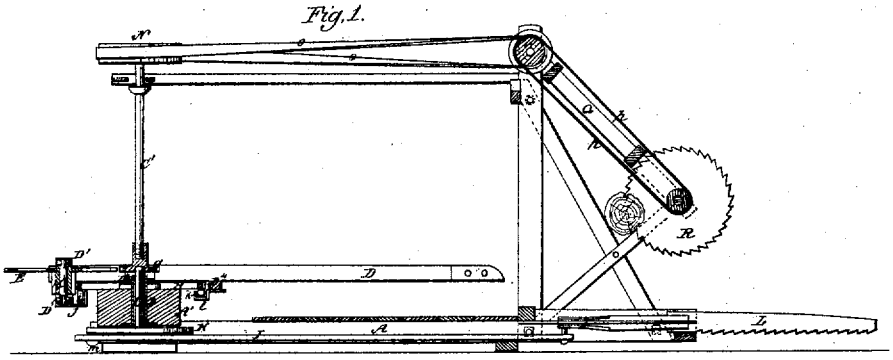
Figure 1 is a longitudinal section taken through the improved horse-power applied to machinery for sawing logs.
Figure 2:
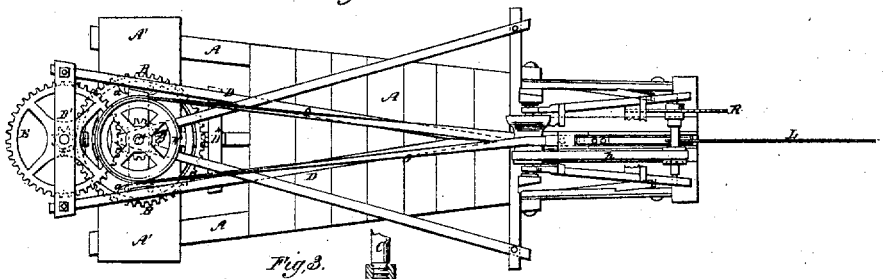
Figure 2 is a top view of the same.

In the accompanying drawings, figs. 1 and 2, I have represented my improved horse-power applied to a framework, upon which two saws are mounted, one of which, R, is a circular saw, and the other a reciprocating straight saw. The frame A consists of two longitudinal beams, which are connected together at a suitable distance apart by means of transverse beams and a flooring, over which latter the horse walks in his travel. The horizontal transverse beam A′, at one end of the frame A, is made very strong, and it is somewhat elevated so as to bring the sweep D to a proper height for hitching a horse to it. This beam A′, with its frame A, forms a solid and substantial foundation for supporting the parts which constitute the improved horse-power. Upon the top of beam A′ is a large spur-wheel, B, which is constructed with lugs *a a* upon its inner edge, through which bolts pass that secure rigidly the wheel in place. A hole is bored vertically through the beam A′, concentric to the stationary spur-wheel B, through which a tubular collar or hub, *b*, is passed, and suitably secured, so that its upper end projects above the horizontal plane of the said wheel; and through this hub a shaft, C, passes, which I shall term the driving-shaft. The hub *b* forms a durable bearing for the driving-shaft, and while it protects the wood surrounding it from wearing out rapidly by the shaft C, it also admits of this shaft being kept well oiled, so as to turn freely.

Figure 3:
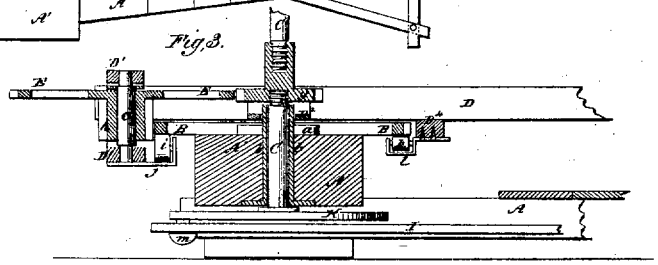
Figure 3 is an enlarged longitudinal section through the horse-power, taken in the vertical plane indicated by red line *x x* in fig. 4.
Figure 4:
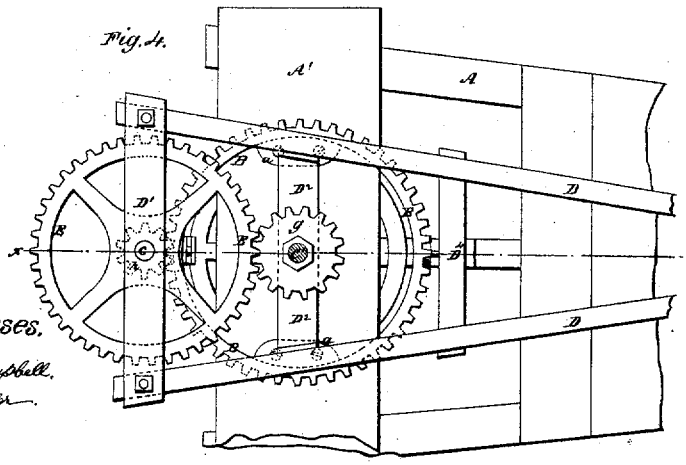
Figure 4 is a top view of the horse-power.

The sweep D is made of two beams, connected together at one end by transverse beams $D^1$, so as to form a triangle, and possess strength and likeness. At a suitable distance from the cross-beams $D^1$ a bar, $D^2$, is secured across the bottom sides of the longitudinal beams of the sweep, through the middle of the length of which bar a hole is made for receiving the upper end of the hub *b*, as shown in figs. 1 and 3, thereby making this hub serve as the fulcrum of the sweep, and having the axis of motion thereof to coincide with the axis of motion of the driving-shaft C, as shown in figs. 2 and 4. This arrangement brings the sweep over the stationary wheel B, so that should the former cant laterally the ends of the cross-bar $D^2$ will be brought upon said wheel. In practice the distance between the upper surface of the stationary wheel B and the bar $D^2$ is so slight that the sweep cannot cant or tilt laterally to any injurious extent.

Between the two cross-beams $D^1$ of the sweep D is a large spur-wheel, E, which is keyed on a short vertical shaft, *c*, which has its end bearings in said beams, as shown in figs. 1 and 3. The wheel E engages with the teeth of a pinion-wheel, *g*, which is keyed on the shaft C. Beneath the large wheel E, and keyed to its shaft, *c*, is a pinion-wheel, *h*, the teeth of which engage with those on the circumference of the stationary wheel B, as shown in figs. 1, 3, and 4. When the sweep D is moved around it carries with it the two wheels E and *h* around the axis of the stationary wheel B. The effect of this movement will be to cause the said wheels to rotate about their axes, and communicate a rapid rotary motion to the driving-shaft C.

It is very important, with the above-described arrangement of gearing, to have the sweep move around in a plane parallel to the plane of the stationary wheel B, otherwise the teeth of the four wheels will be liable to become broken, and the effective power of the machine impaired. I have described a mode of preventing the sweep from tilting laterally. I will now describe a mode of preventing it from tilting longitudinally.

Upon the lower cross-beam $D^1$ a bracket, *j*, is firmly bolted, one end of which projects inward beneath the wheel B, and is turned up, as shown in figs. 1 and 3. This bracket carries an anti-friction roller, *i*, which bears against the lower flat side of the wheel B. Diametrically opposite this roller is another roller, *k*, which is applied to a bracket, *l*, that is secured to a transverse bar, $D^4$, and which bears against the lower surface of said wheel B, and like the roller *i* travels around freely with the sweep. These anti-friction rollers prevent either end of the sweep from being raised up or down, and consequently keep the spur-wheels always in proper gear, and prevent any injury to their teeth. The driving-shaft C extends a short distance above the upper end of the hub *b*, and also a short distance below the cross-beam A′. On the lower end of this shaft C I secure a balance-wheel, H, for equalizing the movements of the gearing, and in the lower face of this wheel, near its circumference, a wrist-pin, *m*, is secured, to which is pivoted, in a suitable manner, a pitman-rod, I, which will communicate a rectilinear reciprocating motion to a saw, I, or to any other object. In the upper end of the shaft C a socket is made for receiving a removable shaft, C′, which proceeds upward a proper height, and carries on its upper end a belt-wheel or pulley, N, for communicating a rotary motion to a circular saw, R, or any other object which it may be desired to drive. If a circular saw, R, be used for cross-cutting logs, it may be hung in a vibrating frame, Q, and driven by means of belts *o p*, so that while the saw rotates it will move down to the log upon the cross-frame S, as shown in figs. 1 and 2. If a reciprocating saw be used, it will be pivoted at one end to a reciprocating cross-head, so as to rise and fall in the arc of a circle.

I do not desire to confine my invention to the use of saws, as it is adapted for driving grinding-mills, churning machines, and all varieties of light-running machinery requiring one or two horse-power to run it.

Having described my invention, what I claim as new, and desire to secure by Letters Patent, is—

1. In combination with a stationary spur-wheel, B, having a driving-shaft, C, passing through its centre, and which carries upon one end a pinion spur-wheel, *g*, I claim the rotating spur-wheel F and pinion *h*, applied on the short arm of a triangular sweep, D, which turns about the axis of said shaft, and carries these wheels E and *h* around with it, substantially as described.

2. Sustaining the revolving sweep D by means of a transverse brace, $D^2$, which is applied loosely to a fixed hub, *b*, through which the driving-shaft passes, said sweep being arranged over the stationary wheel B, and carrying the wheels E and *h*, substantially as described.

3. In conjunction with a sweep, D, which turns freely around a fixed hub, *b*, and driving-shaft C, and which carries the spur-wheels E and *h* upon one end, I claim the use of lower guides, *i k*, or their equivalents, applied beneath the stationary wheel B, substantially as described.

4. The sweep D, cross-brace $D^2$, hollow hub *b*, stationary wheel B, and the lower guides *i k*, arranged and operating in a machine, substantially as described.

5. In combination with the sweep D, revolving around a fixed hub, *b*, and driving-shaft C, and carrying the wheels E *h* around the stationary wheel B, I claim the use of a removable shaft, C′, carrying a driving-pulley, N, substantially as described.

6. In combination with the sweep D, revolving around a fixed hub, *b*, and driving-shaft C, and carrying the wheels E and *h* around the stationary wheel B, I claim the use of a balance-wheel, H, carrying a wrist-pin, *m*, and pitman-rod I, and arranged beneath the supporting-beam A′ and frame A, substantially as described.

EDSELL TOTMAN.

Witnesses:
EDW. SCHAFER,
WALTER HINCHMAN.